Oct. 2, 1923.
W. B. MINCH
WHEEL
Filed June 6, 1921
1,469,265
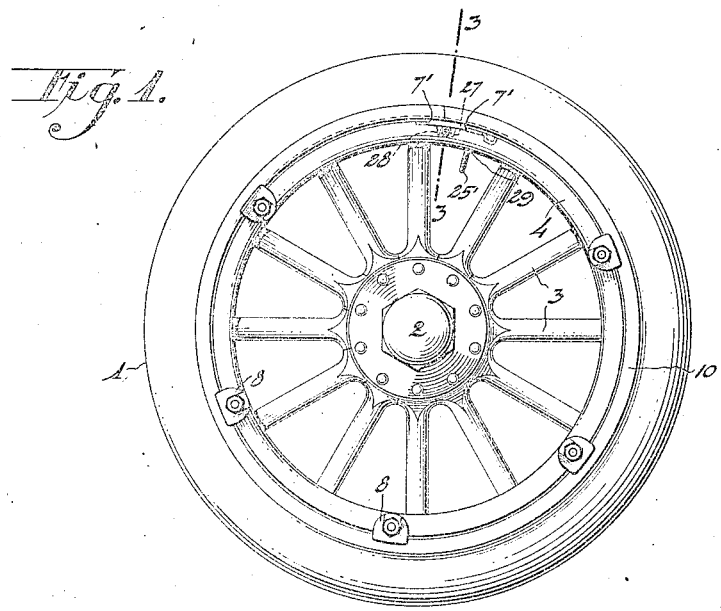
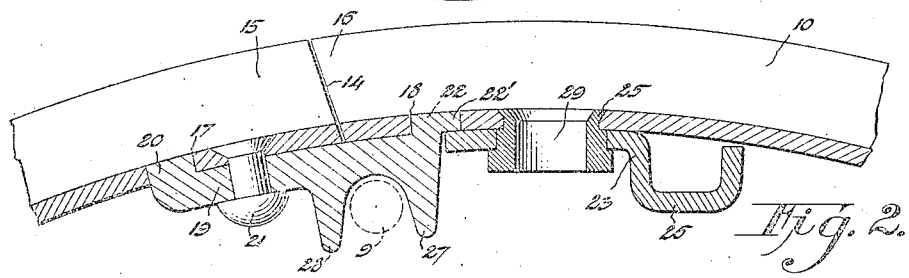
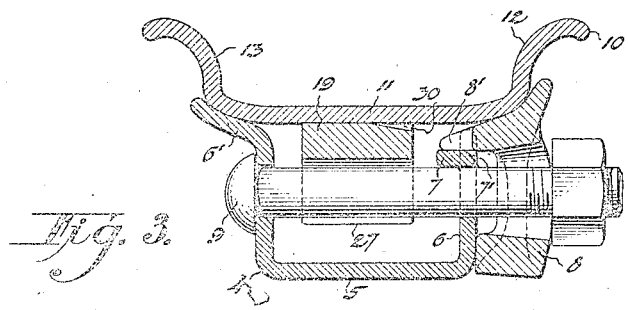
Inventor.
W. B. Minch
By his Attorneys:

Patented Oct. 2, 1923.

1,469,265

UNITED STATES PATENT OFFICE.

WALTER B. MINCH, OF JACKSON, MICHIGAN, ASSIGNOR TO GENERAL MOTORS CORPORATION, OF DETROIT, MICHIGAN, A CORPORATION OF DELAWARE.

WHEEL.

Application filed June 6, 1921. Serial No. 475,377.

*To all whom it may concern:*

Be it known that I, WALTER B. MINCH, a citizen of the United States, and a resident of Jackson, county of Jackson, and State of Michigan, have invented certain new and useful Improvements in Wheels, of which the following is a full, clear, concise, and exact description, such as will enable others skilled in the art to which the invention relates to make and use the same, reference being made therein to the accompanying drawings, which form a part of this specification.

This invention relates to demountable rims for wheels for motor vehicles.

One of the objects of the invention is the provision of new and improved latching means for holding the ends of a split rim locked together in alignment.

Another object of the invention is the provision of a wheel having a split rim that is provided with a combined latch and driver, that may be readily applied to the rim; that is cheap to manufacture; simple in construction; efficient in operation; easy to manipulate; and that is not likely to get out of order.

Other and further objects and advantages of the invention will appear as the description proceeds.

Figure 1 is a side elevation of a wheel and rim showing my invention applied thereto in dotted lines.

Figure 2 is a longitudinal section of a portion of a rim with the latch in section.

Figure 3 is a cross section on line 3—3 of Figure 1.

On the drawings, the reference character 1 designates a wheel of an automobile which consists of the hub 2, spokes 3 and felly 4 mounted on the outer end of the spokes as is usual in such constructions. The felly 4 may be formed from metal of any suitable cross section. As shown, the felly consists of the base portion 5 having a radially extending flange 6 at its outer edge and a radially and inwardly extending flange 6' on its inner edge. The flange 6 is provided at intervals with suitable seats 7 for the rim retainers 8. The seats 7 may be formed in any convenient manner. As shown on the drawings, the seats are formed by making shallow cuts 7' in the outer edge of the flange 6 forming the members 7 which are adapted to be bent inwardly as shown in Figure 4, to form seats for the wedge portion 8' of the retainers 8. The retainers 8 are held in position by means of the bolts 9, on which the seats 7 rest when the retainers are applied.

The wheel is provided with a demountable rim 10 which may be of any suitable form or construction. The rim shown is provided with the usual base portion 11 and the flanges 12 and 13.

The rim 10 is trans-split at 14 forming the rim ends 15 and 16. The split 14 may if desired be arranged at an angle to the radius in order that the separation of the rim ends may be more easily accomplished. The two ends of the rim are detachably connected together by a latch mechanism which will presently be described.

The ends 15 and 16 of the rim are provided with apertures 17 and 18 adjacent the ends thereof. A latch member 19 has one end provided with a radially extending member 20 which is adapted to engage in the aperture 17 in the end 15. The latch is rigidly secured to the end 15 by any suitable means such as the rivet 21. The free end of the latch is also provided with the radially extending member 22 which is adapted to engage the aperture 18 in the end 16 of the rim. The rim is so constructed that its resilience will cause the member 22 to snap into the aperture 18 when the ends thereof are brought into alignment. Under normal conditions this resilience is sufficient to hold the member 22 in the aperture but as a safety device, a retaining latch or turn button 23 is provided for engaging an extension or toe-piece 22' on the latch member 19.

The retaining latch or turn button 23 is adapted to be pivotally connected to the rim end 16 by means of a hollow rivet 25. The rivet 25 is made hollow to receive the valve stem 25' of the tire. The free end of the turn-button 23 is provided with some suitable means such as the loop 26 whereby a tool, such as a screwdriver, may be inserted to turn said button.

The latch 19 may be provided with one or more inwardly extending projections which are adapted to serve as a driver for the rim. As shown on the drawing, the latch is provided with a bifurcated driver which consists of two projections 27 and 28 which are spaced apart a sufficient distance to permit said projections to engage on each side of one of the wedge bolts 9.

In applying the rim to the felly the projections 27 and 28 of the latch member 19 are caused to engage each side of the bolt 9 nearest the valve stem opening 29 in the base of the felly 4, in order that the valve stem which is adapted to extend inwardly through the opening 25 in the rim may also extend through this opening 29. After the wedges 8 are applied they are forced inwardly by means of the nuts on the bolts 9, thus forcing the rim inwardly and radially outward and wedging the same against the inner flange 6 of the felly. The latch member 19 prevents the separation of the ends of the rim when the wedges are forced inwardly. A notch 30 is provided in the outer side of the latch 19 for the reception of a tool whereby the member 22 may be disengaged from the opening 18.

Attention is directed to the fact that there is no shearing action on the rivet 21 when the wedges are applied because all the strain is taken by the laterally extending projections 20 and 22 of the latch. This is an important feature of my invention because it not only permits the latch to be used as a driver but also prevents any shearing action on the rivet 21 during the travel of the automobile, or during the tightening of the wedges 8.

While one embodiment of the present invention has been specifically illustrated and described, it is to be understood that the present invention is not limited thereto except as required by the language of the following claims when interpreted in view of the prior art.

I claim:

1. In a device of the class described, a transversely split rim, a latch for securing said rim ends together, said latch provided with projections for engaging each side of a driving bolt, a pivoted retainer for said latch, the pivot of said retainer being hollow to provide a valve stem opening, substantially as shown and described.

2. In a device of the class described, a transversely split rim; a latch rigidly secured to one end of said rim and extending across the joint between the ends thereof, and having a projection at its free end adapted to enter an opening provided adjacent the other end of said rim; a swinging retaining member adapted to engage the free end of said latch to thereby hold the projection at said end within the opening aforesaid; and a bifurcated driving lug carried by said latch and located intermediate the ends thereof.

3. In a device of the class described, a split rim, a latch rigidly secured to one end of said rim for securing the ends thereof together, and a member pivoted to the other end of said rim so as to swing laterally thereof for securing said latch in operative position, the free end of said member being bent to provide a tool engaging loop for the reception of a tool for turning said member, substantially as shown and described.

In testimony whereof I affix my signature.

WALTER B. MINCH.